United States Patent [19]

Ohnishi et al.

[11] Patent Number: 5,245,243
[45] Date of Patent: Sep. 14, 1993

[54] ULTRASONIC MOTOR WITH A FRICTION COMPONENT

[75] Inventors: Kazumasa Ohnishi, Nagaoka; Masahiro Uchiyama, Mitsuke, both of Japan

[73] Assignee: Alps Electric Co., Ltd., Tokyo, Japan

[21] Appl. No.: 889,685

[22] Filed: May 27, 1992

[30] Foreign Application Priority Data

Jun. 12, 1991 [JP] Japan .................... 3-140459

[51] Int. Cl.⁵ ............................... H01L 41/08
[52] U.S. Cl. ................................... 310/323
[58] Field of Search ........................ 310/323

[56] References Cited

U.S. PATENT DOCUMENTS

| | | | |
|---|---|---|---|
| 4,663,556 | 5/1987 | Kumada | 310/333 |
| 4,884,002 | 11/1989 | Eusemann et al. | 310/323 |
| 4,926,085 | 5/1990 | Sawayama et al. | 310/323 |
| 4,963,781 | 10/1990 | Sumihara et al. | 310/323 |
| 5,013,956 | 5/1991 | Kurozumi et al. | 310/323 |
| 5,034,646 | 7/1991 | Shirasaki | 310/323 |
| 5,059,849 | 10/1991 | Sumihara et al. | 310/323 |
| 5,122,700 | 6/1992 | Tamai et al. | 310/323 |
| 5,148,075 | 9/1992 | Shirasaki | 310/323 |

FOREIGN PATENT DOCUMENTS 0178578 8/1991 Japan ................... 310/323

Primary Examiner—Mark O. Budd
Assistant Examiner—Thomas M. Dougherty
Attorney, Agent, or Firm—Guy W. Shoup; Patrick T. Bever

[57] ABSTRACT

In the ultrasonic motor according to the present invention, a carbon fiber reinforced plastic whose carbon fibers are arranged in one direction is used for a friction member applied to a sliding surface of a stator or rotor; Vickers hardness is Hv550 or more; and a sliding surface of the rotor or stator in sliding relationship with the friction member has surface roughness of Ra=0.03 μm or less.

2 Claims, 2 Drawing Sheets

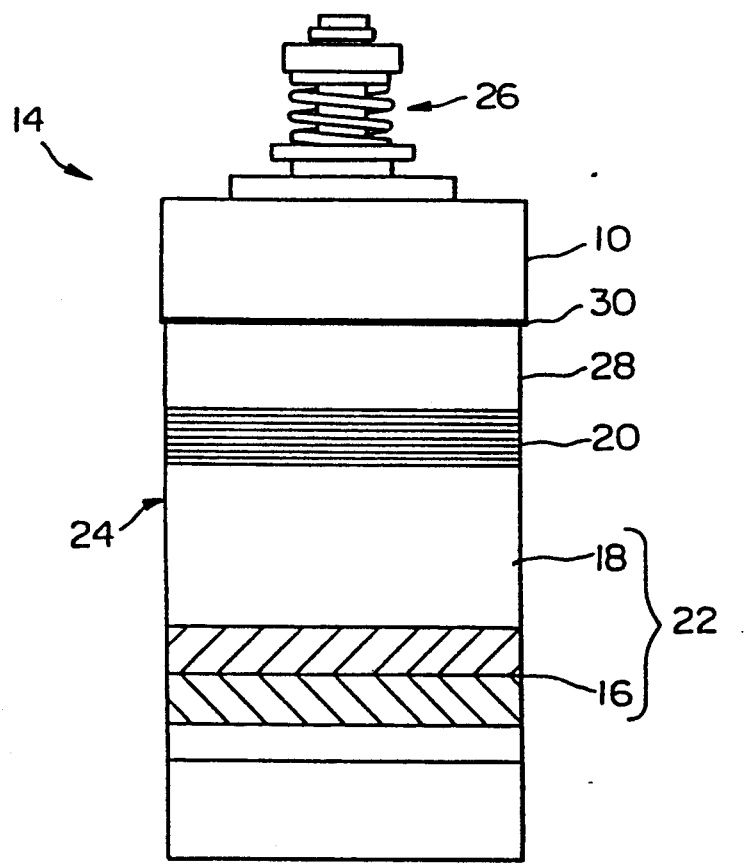

ULTRASONIC MOTOR WITH A FRICTION COMPONENT

BACKGROUND OF THE INVENTION

The present invention relates to a friction member and a rotor or stator of an ultrasonic motor.

An example of an ultrasonic motor is shown in FIG. 3.

The cylindrical composite vibrator type ultrasonic motor 14 shown in FIG. 3 is generally composed of a stator 24 comprising a torsional vibrator 22, a longitudinal displacement type piezoelectric element 20, and a stator head 28, and a rotor 10 rotatably coupled thereon.

The torsional vibrator 22 is composed of a laminated piezoelectric member 16 such as lead zirconate titanate and a cylindrical vibrator 18 disposed thereon.

A longitudinal displacement type piezoelectric element 20 which operates as a clutch when actuated and a stator head 28 is disposed on the torsional vibrator 22.

The surface of the stator head 28 which is in contact with the rotor 10 is a stator sliding surface onto which a friction member 30 is applied.

The rotor 10 is bolted with a spring 26 interposed and is thereby urged onto the friction member 30 of the stator 24 at a predetermined pressure (preloaded).

In the composite vibrator type ultrasonic motor 14 having the configuration as described above, an application voltage of the resonance frequency of the torsional vibrator 22 is applied to the torsional vibrator 22 and the longitudinal displacement type piezoelectric element 20. This causes torsional vibration of the torsional vibrator 22 and expansion and contraction of the longitudinal displacement type piezoelectric element 20. The combination of these vibrations allows the rotor 10 to be continuously rotated in one direction.

The driving torque of ultrasonic motors including composite vibrator type ultrasonic motors is largely dependent on the friction force between the stator head 28 (substantially the friction member 30) and the rotor 10. That is, a large driving torque can not be generated unless the friction member has a certain degree of friction coefficient.

In addition, the abrasion resistance of the friction member 30 determines the durability and life of an ultrasonic motor itself.

Accordingly, the friction member is required to be able to withstand for a 10,000-hr driving period and, at the same time, to generate a predetermined driving torque.

In general, a polyimide type resin is used for the friction member 30 but it does not necessarily provide satisfactory results.

SUMMARY OF THE INVENTION

The present invention has been conceived to solve the above-mentioned problems and provides an ultrasonic motor wherein a carbon fiber reinforced plastic whose carbon fibers are arranged in one direction is used as a friction member and the carbon fibers of the friction member are arranged in the direction in which the rotor rotates to enhance the durability and to extend the life while generating a large driving torque.

The ultrasonic motor according to the first invention is an ultrasonic motor wherein a stator having a piezoelectric element and a rotor are rotatably coupled and a friction member is applied to a sliding surface of the stator or rotor, the friction member being made of a carbon fiber reinforced plastic whose carbon fibers are arranged in one direction. The direction of the carbon fibers is the direction in which the rotor rotates.

In addition, the sliding surface of the rotor or stator which is in sliding relationship with the friction member has Vickers hardness of Hv550 or more.

The ultrasonic motor according to the second invention is an ultrasonic motor according to the first invention wherein the sliding surface of the rotor or stator which is in sliding relationship with the friction member has surface roughness of Ra=0.03 $\mu$m or less (the average roughness at the center line).

The ultrasonic motor according to the present invention employees a carbon fiber reinforced plastic in which carbon fibers are arranged in one direction, as the friction member interposed between the stator head main body and the rotor. Further, the friction member is applied so that the direction of carbon fibers is in parallel with the direction in which the rotor rotates.

The use of the above-described material and configuration results in improved abrasion resistance without a reduction in the friction coefficient of the friction member. As a result, the ultrasonic motor according to the present invention has a longer life with an improved driving torque.

BRIEF DESCRIPTION OF THE DRAWINGS

FIG. 3 is a side view of a conventional ultrasonic motor.

DETAILED DESCRIPTION OF THE INVENTION

First embodiment

Figure 1:
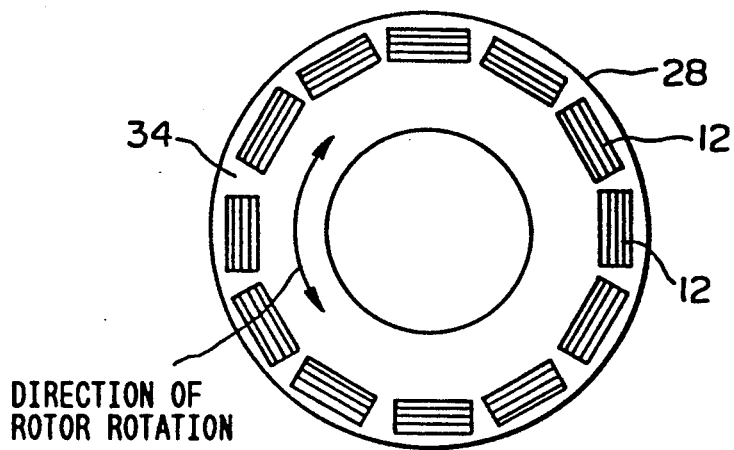
FIG. 1 is a plan view showing a friction member of a first embodiment of the present invention applied to a stator head.

A composite vibrator type ultrasonic motor according to the present embodiment will now be described with reference to FIG. 1 and FIG. 2.

The cylindrical composite vibrator type ultrasonic motor 32 is generally composed of a stator 24 comprising a torsional vibrator 22, a longitudinal displacement type piezoelectric element 20, and a stator head 28, and a rotor 10 rotatably coupled thereon.

The torsional vibrator 22 is composed of a laminated piezoelectric element 16 made of a piezoelectric material such as lead zirconate titanate and a cylindrical vibrator 18 disposed thereon.

A longitudinal displacement type piezoelectric element 20 which operates as a clutch when actuated and a stator head 28 are disposed on the torsional vibrator 22.

The surface of the stator head 28 which is in contact with the rotor 10 is a stator sliding surface 34 onto which a friction member 12 is applied.

The rotor 10 is bolted with a spring 26 interposed and is thereby urged onto the friction member 12 of the stator 24 at a predetermined pressure (preloaded).

As the friction member 12 of the ultrasonic motor according to the present invention, carbon fiber reinforced plastics (CFRP) obtained by impregnating a matrix resin with carbon fibers, especially those wherein the carbon fibers impregnated are arranged in one direction are used.

Figure 2:
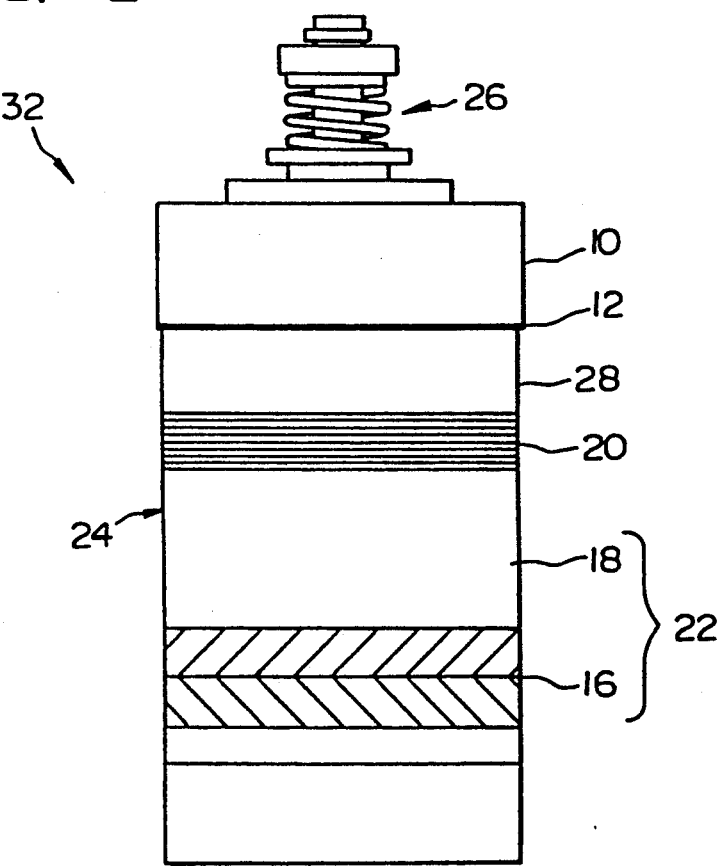
FIG. 2 is a side view of an ultrasonic motor of the first embodiment.

As shown in FIG. 1, the friction member 12 is applied to a stator sliding surface 34 of the stator head 28 so that the direction of the carbon fibers is brought into the best possible parallelism with the direction in which the rotor 10 rotates. In this regard, the scope of the present invention, of course, covers an arrangement of the carbon fibers in the direction of the tangent to the direction in which the rotor 10 rotates as shown in FIG. 1, an arrangement wherein the carbon fibers form links, and the like.

There is no restriction on the matrix resin to be used but epoxy resins are especially preferable.

In addition to the friction member 12, the material of the rotor 10 which is in sliding relationship with it is also important with regard to the driving torque and durability of the composite vibration type ultrasonic motor 32. Therefore, a rotor sliding surface of the rotor in contact with the friction member 12 preferably has Vickers hardness of Hv550 or more, and it is adequate to use a rotor sliding surface plated with hard chromium or coated with titanium nitride, or rotor 10 which is hardened as a whole or in parts including the rotor sliding surface with martensitic stainless steel (especially SUS 440 C).

In addition, the rotor sliding surface of the rotor 10 is more preferably mirror-finished to have surface roughness of Ra=0.03 μm or less (the average roughness at the center line) resulting in improved abrasion resistance of the friction member. In the composite vibrator type ultrasonic motor 32 having the above-described configuration, an application voltage of the resonance frequency of the torsional vibrator 22 is applied to the torsional vibrator 22 and the longitudinal displacement type piezoelectric element 20. This results in the torsional vibration of the torsional vibrator 22 and the expansion and contraction of the longitudinal displacement type piezoelectric element 20. The rotor 10 can be thus continuously rotated in one direction.

A durability test was carried out on the composite vibrator type ultrasonic motor of the present embodiment. A cylindrical composite vibrator type ultrasonic motor having a diameter of 30 mm was used in this test. With a load of 7 Kgf·cm, it was continuously rotated at 83 rpm and the abrasion characteristics of the friction member were checked.

Three types of friction members were used as examples for comparison, i.e., a conventional type made of a polyimide type resin, a type made of a carbon fiber reinforced plastic wherein carbon fibers are arranged in a direction perpendicular to the stator sliding surface, and a type wherein carbon fibers are arranged in the radial direction of the rotor.

The friction member of the composite vibrator type ultrasonic motor of the present embodiment exhibited no abrasion after a 50-hr continuous driving period. In addition, the occurrence of irregularity in rotor rotation and noises from the stator sliding surface were suppressed.

However, all the friction members used as examples for comparison showed poor results in this test. The polyimide type resin friction member was defective after continuous driving for 2.5 hours.

The ultrasonic motor according to the present embodiment employs a carbon fiber reinforced plastic whose carbon fibers are arranged in one direction as a friction member applied to the stator sliding surface of the stator head and the carbon fibers of the friction member are arranged in the direction of in which the rotor rotates to enhance the abrasion resistance and durability as an ultrasonic motor and to extend the life while generating a great driving torque.

Although a composite vibrator type ultrasonic motor has been described as an example in the present embodiment, it goes without saying that a similar configuration and effect can be achieved in a travelling wave type ultrasonic motor.

Second embodiment

The friction member can be applied not only to the stator sliding surface of the stator head as in the composite vibrator type ultrasonic motor of the first embodiment but also to the rotor. Specifically, in a composite vibrator type ultrasonic motor as a second embodiment, a carbon fiber reinforced plastic (CFRP) obtained by impregnating a matrix resin with carbon fibers wherein the carbon fibers are arranged in one direction is used as the friction member, and is applied to the rotor sliding surface of the rotor so that the carbon fibers of the friction member are arranged in parallel with the direction in which the rotor rotates.

In this regard, the scope of the present invention, of course, covers an arrangement of the carbon fibers in the direction of the tangent to the direction in which the rotor rotates and an arrangement wherein the carbon fibers form links.

In addition, the stator sliding surface of the stator head is important with regard to the driving torque and durability of the composite vibration type ultrasonic motor of the second embodiment. Therefore, the stator sliding surface of the stator head preferably has Vickers hardness of Hv550 or more, and it is preferably to use a stator sliding surface plated with hard chromium or coated with titanium nitride (TiN), or a stator head which is hardened as a whole or in parts including the stator sliding surface with martensitic stainless steel (especially SUS 440C).

Further, the stator sliding surface of the stator head is more preferably mirror-finished to have surface roughness of Ra 0.03 μm or less.

In the ultrasonic motor according to the second embodiment, a carbon fiber reinforced plastic whose carbon fibers are arranged in one direction is used as a friction member; the friction member is applied to the rotor sliding surface of the rotor; and the carbon fibers of the friction member are arranged in the direction in which the rotor rotates. As a result, high abrasion resistance and high durability as an ultrasonic motor and a long life are provided with a large driving torque being generated.

The ultrasonic motor according to the present invention employs a carbon fiber reinforced plastic whose carbon fibers are arranged in one direction for a friction member applied to a stator sliding surface of a stator head or a rotor sliding surface of a rotor, the carbon fibers of the friction member being arranged in the direction in which the rotor rotates. This results in high abrasion resistance, high durability as an ultrasonic motor, and a long life with a large driving torque.

The durability is further improved by using one having Vickers hardness of Hv550 or more for the member which is in sliding relationship with the friction member, Further, the durability is improved by keeping the surface roughness of the sliding surface of the rotor or stator which is in sliding relationship with the friction member below Ra=0.03 μm.

What is claimed is:

1. An ultrasonic motor comprising:
   a stator including a piezoelectric element and having a first surface,
   a rotor rotatably coupled to said stator, said rotor having a second surface disposed to slide against the first surface;
   a friction member disposed on the first surface,
   wherein the friction member comprises carbon fiber reinforced plastic having carbon fibers arranged in a rotating direction of the rotor, and
   wherein the second surface has a Vickers hardness of Hv550 or more and a surface roughness of Ra=0.03 μm or less.

2. An ultrasonic motor comprising:
   a stator including a piezoelectric element and having a first surface,
   a rotor rotatably coupled to said stator, said rotor having a second surface disposed to slide against the first surface;
   a friction member disposed on the second surface,
   wherein the friction member comprises carbon fiber reinforced plastic having carbon fibers arranged in a rotating direction of the rotor, and
   wherein the first surface has a Vickers hardness of Hv550 or more and a surface roughness of Ra=0.03 μm or less.

* * * * *